United States Patent Office 2,742,397
Patented Apr. 17, 1956

2,742,397

ANALGETIC COMPOSITIONS OF N-(1-METHYL PROPYL) CYCLOHEXYLAMINE

Wallace L. Ott, Colorado Springs, Colo., assignor to Commercial Solvents Corporation, Terre Haute, Ind., a corporation of Maryland No Drawing. Application June 9, 1953,
Serial No. 360,585

8 Claims. (Cl. 167—65)

My invention relates to compositions useful for producing analgesia. More particularly my invention relates to analgetic compositions in which the active ingredient is N-(1-methylpropyl)cyclohexylamine and to the process of producing analgesia with such compositions.

In the past a large number of substances have been used as analgetics, both products of nature and synthetic compounds. All of these substances have suffered from one or more serious disadvantages when used to produce analgesia. Some of them are strong narcotics, and give rise to addiction. Others produce very strong toxic reactions in the human body such as depression, nausea, ataxia, etc. Still others are only slightly effective and give no relief against deepseated and pronounced pain.

I have now discovered that analgetic compositions containing N-(1-methylpropyl)cyclohexylamine or salts thereof can be prepared in easily adminstered oral dosage forms, which are effective as analgetics and free from the undesirable toxic side reactions encountered with other analgetics. My invention embraces the use as an analgetic of N-(1-methylpropyl)cyclohexylamine in all its therapeutically active forms. Thus, my invention includes the use of the free amine or any of its common salts, such as, for example, the hydrochloride, acid sulfate, neutral sulfate, monobasic phosphate, tribasic phosphate, etc.

According to my invention, N-(1-methylpropyl)cyclohexylamine or salts thereof may be associated with a carrier which may be either a solid material, an oral liquid base, or a sterile injectable fluid. In contrast to older analgetics which generally exhibit low activity when orally administered, my new compositions are relatively more effective upon oral administration than the old materials. Thus, oral administration is the preferred method of use of my new composition.

Compositions for oral ingestion may take the form of tablets, powders, capsules, syrup elixirs, or other dosage forms particularly useful for oral treatment. These compositions consist of N-(1-methylpropyl)cyclohexylamine or salts thereof as the active analgetic admixed with the chosen carrier. Any of the tableting materials used in pharmaceutical compounding may be employed so long as no incompatibility with N-(1-methylpropyl)cyclohexylamine exists. The active ingredient with adjuvants may be put in the form of a powder, which can be used in a capsule. Any aromatic elixir bases commonly used in pharmaceutical practice may be used as carriers for the active analgetic where N-(1-methylpropyl)cyclohexylamine or salt thereof is sufficiently soluble therein and no incompatibility with the active ingredient exists.

My new compositions can also take the form of fluids for injection. For injection, N-(1-methylpropyl)cyclohexylamine or a salt thereof is dissolved in a sterile liquid diluent such as, for example, oil, water, etc.

My invention is illustrated by the following examples of suitable dosage forms of the compositions, but we do not intend to be limited by any of the proportions or amounts set forth therein.

EXAMPLE I

A suitable formulation of tablets consists of:

|   | Grams |
|---|---|
| A. N-(1-methylpropyl)cyclohexylamine | 12.5 |
| B. Lactose | 80 |
| C. Starch | 5 |
| D. Magnesium stearate | 2 |

The N-(1-methylpropyl)cyclohexylamine, lactose, and starch are thoroughly mixed and granulated. For tableting, the magnesium stearate is added, mixed with the granules, and the mixture tableted on a rotary press. Use of this procedure produces 1000 tablets each containing 12.5 mg. of the active analgetic.

EXAMPLE II

Another suitable formulation of tablets consists of:

|   | Grams |
|---|---|
| A. N-(1-methylpropyl)cyclohexylamine | 25 |
| B. Mannitol | 160 |
| C. Starch | 10 |
| D. Magnesium stearate | 4 |

The N-(1-methylpropyl)cyclohexylamine, mannitol, and starch are thoroughly mixed and granulated. For tableting, the magnesium stearate is added, mixed with granules, and the mixture tableted on a rotary press. Use of this procedure produces 1000 tablets each containing 25 mg. of the active analgetic.

EXAMPLE III

Another suitable formulation of tablets consists of:

|   | Grams |
|---|---|
| A. N-(1-methylpropyl)cyclohexylamine | 25 |
| B. $\beta$-lactose | 70 |
| C. Dextrin | 10 |
| D. Hydrogenated vegetable oil | 0.5 |
| E. Talc | 2 |

The N-(1-methylpropyl)cyclohexylamine, $\beta$-lactose, and dextrin are thoroughly mixed and granulated. For tableting, the hydrogenated vegetable oil and talc are added, mixed with the granules, and the mixture tableted on a rotary press. Use of this procedure produces 2000 tablets of 12.5 mg. of active analgetic.

EXAMPLE IV

Another suitable formulation of tablets consists of:

|   | Grams |
|---|---|
| A. N-(1-methylpropyl)cyclohexylamine | 25 |
| B. $\beta$-lactose | 140 |
| C. Starch | 10 |
| D. Dextrin | 20 |
| E. Magnesium stearate | 4 |

The N-(1-methylpropyl)cyclohexylamine, $\beta$-lactose, starch, and dextrin are thoroughly mixed and granulated. For tableting, the magnesium stearate is added, mixed with the granules, and the mixture tableted on a rotary press. Use of this procedure produces 1000 tablets each containing 25 mg. of the active analgetic.

EXAMPLE V

A suitable formulation of oral elixir consists of:

A. N-(1-methylpropyl)cyclohexylamine __grams__ 118.8
B. Aromatic elixir base to make _____liters__ 47.5
    Base contains: orange spirits, sugar syrup, ethyl alcohol, and distilled water Use of the above formula will make 100-pint bottles of oral elixir. Each bottle contains approximately 100 one-teaspoon doses. Each dose contains 12.5 mg. of active analgetic.

EXAMPLE VI

An illustrative example of preparing solutions for injection consists of placing 300 milliliters of distilled water for injection, U. S. P., in a two-liter Pyrex flask, and adding 7.5 grams of N-(1-methylpropyl)cyclohexylamine hydrochloride with stirring until solution is effected. The pH is then adjusted with N/10 hydrochloric acid to a pH of approximately 6.0. Sufficient water for injection is added to make the volume to 1 liter. The solution is filled into clean, dry 1-cc. ampules and the ampules are sealed and sterilized.

I prefer to prepare my analgetic composition in dosage forms containing not less than about 0.1% and not more than about 50% of N-(1-methylpropyl)cyclohexylamine or salt thereof. The dosage forms are preferably prepared to contain from about 1 to about 200 mg. of the analgetic material itself.

The acute toxicity of N-(1-methylpropyl)cyclohexylamine hydrochloride in animals was determined on mice, rats, cats, and dogs. All toxicity determinations were obtained on fasted animals. The results of acute toxicity tests are reported in Tables I below as milligrams per kilogram of body weight.

The $ED_{50}$ is that dose of the compound under study which will increase the reaction time as much as 0.5 second in 50% of the animals treated. The $TD_{50}$ is the dose that will produce side effects of any type in 50% of the animals treated. The $LD_{50}$ is that dose that will produce death in 50% of the animals treated. The oral $LD_{50}$ was determined from the mortality ratio obtained at the end of a seven day observation period, using five rats per dose level. The $LD_0$ is the greatest dose that did not produce death in any of the animals so treated, and the $LD_{100}$ is that dose that produced death in all the animals so treated.

Table I
ACUTE TOXICITY OF N-(1-METHYLPROPYL)-CYCLOHEXYLAMINE HYDROCHLORIDE

| Animal | Route of Adm. | Milligrams per Kilogram of Body Weight | | | | |
|---|---|---|---|---|---|---|
| | | $LD_0$ | $LD_{50}$ | $LD_{100}$ | $TD_{50}$ | $ED_{50}$ |
| Mouse | Subcutaneous | 100 | 128±14 | 120 | | |
| Do | Intraperitoneal | 50 | 80±9 | 125 | | |
| Do | Oral | 100 | 280±35 | 400 | | |
| Rat | do | 200 | 315±41 | 500 | 95±9 | <25 |
| Cat | do | >30 | | | 30 (app.) | |
| Dog | do | >30 | | <135 | 30 (app.) | |

In a separate experiment 10 tablets containing a total of 125 mg. of N-(1-methylpropyl)cyclohexylamine hydrochloride were administered orally to dogs. None of the dogs showed any side effects from these massive single doses.

Subacute toxicity studies were conducted on mice. Five mice per dosage level were administered for 14 days daily subcutaneous doses of 64, 32, and 16 mg./kg., and oral doses of 140, 70, and 35 mg./kg. of body weight. These doses were respectively ½, ¼, and ⅛ the subcutaneous $LD_{50}$ and ½, ¼, and ⅛ the oral $LD_{50}$. No deaths occurred in animals treated either subcutaneously or those treated orally during the test period. These results are summarized in Table II below.

Table II
SUBACUTE TOXICITY OF N-(1-METHYLPROPYL)-CYCLOHEXYLAMINE HYDROCHLORIDE

| Route of Adm. | Dose, mg./kg. | No. Animals Treated | No. Deaths |
|---|---|---|---|
| Subcutaneous | 64 | 5 | 0 |
| Do | 32 | 5 | 0 |
| Do | 16 | 5 | 0 |
| Oral | 140 | 5 | 0 |
| Do | 70 | 5 | 0 |
| Do | 35 | 5 | 0 |

Microscopic examination of sections of liver, kidney, lung, and spleen of all animals and of the gastrointestinal tract of those treated orally revealed no pathology which could be attributed to the administration of the drug.

As shown above my new analgetic compositions are effective to induce analgesia and to avoid toxic side effects. In tests using rats it has been determined that a dose of somewhat less than 25 mg./kg. of body weight is sufficient to induce a measurable analgesia. In man the milligram per kilogram ratio necessary for analgesia seems to be substantially lower. Clinical studies with typical human subjects have established that a total dose of from 12½ to 62½ mg. of N-(1-methylpropyl)cyclohexylamine hydrochloride in a composition for oral ingestion will free a human being from various types of organic pain for periods of from 1 to 4 hours. These dosages fall within the range of from 0.2 to 1.4 mg./kg. of human body weights. The ratio established between the $TD_{50}$ and $ED_{50}$ indicates that as much as 20 times this dose could be administered without inducing pronounced toxic side effects.

Now having described my invention what I claim is:

1. An analgetic composition in dosage form comprising from about 1 milligram to about 200 milligrams per dosage unit of N-(1-methylpropyl)cyclohexylamine and a significant amount of a pharmaceutical carrier.

2. An analgetic composition in dosage form comprising from about 1 milligram to about 200 milligrams per dosage unit of N-(1-methylpropyl)cyclohexylamine hydrochloride and a significant amount of a pharmaceutical carrier.

3. An analgetic composition in dosage form comprising from about 1 milligram to about 200 milligrams per dosage unit of a member selected from the group consisting of N-(1-methylpropyl)cyclohexylamine and salts thereof and a pharmaceutical carrier.

4. An analgetic composition in dosage form comprising from about 1 milligram to about 200 milligrams per dosage unit of a member selected from the group consisting of N-(1-methylpropyl)cyclohexylamine and salts thereof and a solid pharmaceutical carrier.

5. An analgetic composition comprising from about 0.1% to about 50% of a member selected from the group consisting of N-(1-methylpropyl)cyclohexylamine and salts thereof and a significant amount of a pharmaceutical carrier.

6. An analgetic composition in dosage form comprising from about 0.1% to about 50% of a member selected from the group consisting of N-(1-methylpropyl)-cyclohexylamine and salts thereof and a significant amount of a solid pharmaceutical carrier.

7. An analgetic composition in dosage form for parenteral use comprising from about 0.1% to about 50% of a member selected from the group consisting of N-(1-methylpropyl)cyclohexylamine and salts thereof and a sterile parenteral diluent at a pH of from about 5.5 to about 7.5.

8. An analgetic composition suitable for oral ingestion comprising from about 0.1% to about 50% of a member selected from the group consisting of N-(1-methylpropyl)-cyclohexylamine and salts thereof and a liquid pharmaceutical carrier.

References Cited in the file of this patent

Burger: Medicinal Chemistry, vol. I, 1951, Interscience Publishers, Inc., New York, p. 188.

Skila et al.: Chemical Abstracts, vol 23 (1929), p. 111.